United States Patent
Neubauer et al.

(10) Patent No.: US 10,626,850 B2
(45) Date of Patent: Apr. 21, 2020

(54) LOAD CARRYING STRUCTURE FOR A MULTIROTOR WIND TURBINE

(71) Applicant: Vestas Wind Systems A/S, Aarhus N. (DK)

(72) Inventors: Jesper Lykkegaard Neubauer, Hornslet (DK); Torben Ladegaard Baun, Skødstrup (DK); Ivar J. b. k. Jensen, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/061,124

(22) PCT Filed: Dec. 21, 2016

(86) PCT No.: PCT/DK2016/050454
§ 371 (c)(1),
(2) Date: Jun. 11, 2018

(87) PCT Pub. No.: WO2017/108057
PCT Pub. Date: Jun. 29, 2017

(65) Prior Publication Data
US 2018/0363631 A1    Dec. 20, 2018

(30) Foreign Application Priority Data
Dec. 22, 2015    (DK) ................................. 2015 70856

(51) Int. Cl.
*E04H 12/00* (2006.01)
*F03D 13/20* (2016.01)
*F03D 1/02* (2006.01)

(52) U.S. Cl.
CPC ............... *F03D 13/20* (2016.05); *F03D 1/02* (2013.01); *Y02E 10/728* (2013.01)

(58) Field of Classification Search
CPC ........... F03D 13/20; F03D 1/02; Y02E 10/728
(Continued)

(56) References Cited

U.S. PATENT DOCUMENTS 1,963,912 A * 6/1934 Honnef ..................... F03D 1/02
                                                                                416/121
2,388,377 A    11/1945   Albers
(Continued)

FOREIGN PATENT DOCUMENTS

| CN | 102305171 A | 1/2012 |
|---|---|---|
| CN | 102305172 A | 1/2012 |

(Continued)

OTHER PUBLICATIONS

Danish Patent and Trademark Office, Search and Examination Report in PA 2015 70856, dated Aug. 16, 2016.
(Continued)

*Primary Examiner* — Basil S Katcheves
(74) *Attorney, Agent, or Firm* — Wood Herron & Evans LLP

(57) ABSTRACT

A load carrying structure (3) for a multirotor wind turbine (1) is disclosed. The load carrying structure (3) comprises a first load carrying arrangement (4) and a second load carrying arrangement (4), and each load carrying arrangement (4) comprises a primary structure (9) and at least two secondary structures (10), the secondary structures (10) extending on opposing sides of the primary structure (9) between an energy generating unit (5) carried by the load carrying arrangement (4) and an attachment point at a tower structure (2). Gravity acting on the energy generating units (5) causes push in the primary structures (9) and pull in the secondary structures (10), thereby causing preload of the secondary structures (10). The load carrying structure (3) is capable of handling thrust loads.

22 Claims, 11 Drawing Sheets

(58) Field of Classification Search
USPC .............................................. 52/40; 416/121
See application file for complete search history.

(56) References Cited

U.S. PATENT DOCUMENTS

| | | | |
|---|---|---|---|
| 2,511,023 A | | 6/1950 | Thomas |
| 4,183,717 A | * | 1/1980 | Yamada .................... F03D 1/02 |
| | | | 416/121 |
| 2018/0283355 A1 | * | 10/2018 | Miranda ................. F03D 7/047 |
| 2018/0355847 A1 | * | 12/2018 | Baun ..................... F03D 7/0224 |
| 2019/0003457 A1 | * | 1/2019 | Miranda ................. F03D 7/042 |

FOREIGN PATENT DOCUMENTS

| | | |
|---|---|---|
| DE | 672606 C | 3/1939 |
| DE | 102012020052 B3 | 4/2014 |
| GB | 572399 A | 10/1945 |
| GB | 2443886 B | 2/2015 |
| WO | 2010098813 A1 | 9/2010 |

OTHER PUBLICATIONS

European Patent Office, International Search Report and Written Opinion in PCT Application No. PCT/DK2016/050454, dated Mar. 21, 2017.
China National Intellectual Property Adminstration, First Notification of Office Action in CN Application No. 201680082275.1, dated Jun. 27, 2019.

* cited by examiner

LOAD CARRYING STRUCTURE FOR A MULTIROTOR WIND TURBINE

FIELD OF THE INVENTION

The present invention relates to a load carrying structure for a multirotor wind turbine. The load carrying structure is arranged for carrying two or more energy generating units of the multirotor wind turbine, and for being connected to a tower structure of the multirotor wind turbine. The invention further relates to a multirotor wind turbine comprising such a load carrying structure. Furthermore, the invention relates to a method for erecting such a multirotor wind turbine.

BACKGROUND OF THE INVENTION

Wind turbines normally comprise one or more energy generating units, each energy generating unit comprising a hub carrying one or more wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, energy generating unit. Such wind turbines are sometimes referred to as 'multirotor wind turbines'.

In multirotor wind turbines the energy generating units may be carried by a load carrying structure which is, in turn, connected to a tower structure. Thereby at least some of the energy generating units are not mounted directly on the tower structure, and they may have a centre of gravity which is displaced with respect to a longitudinal axis defined by the tower structure. When the wind acts on energy generating units mounted in this manner, thrust forces will be created, which will in turn cause loads to be introduced in the load carrying structure, and possibly at connection points between the load carrying structure and the tower structure.

GB 2443886 B discloses a multirotor wind turbine comprising a tower to the top of which a cross-beam structure is mounted by means of a yaw bearing and pivoting connection. The cross-beam structure carries two or more electricity generating turbine rotors mounted at the extremities. The cross-beam may be supported by stays attached to a central column.

DE 10 2012 020 052 B3 discloses a wind turbine with a foundation, a tower and at least one nacelle with a rotor on the tower. The tower is provided with a bearing with an inner part mounted on the tower and an outer part. Two arms are mounted pivotally to the outer bearing part at opposite sides, and the arms carry the nacelles. The arms may be moved pivotally by means of wires attached to the arms and to the tower.

DESCRIPTION OF THE INVENTION

It is an object of embodiments of the invention to provide a load carrying structure for a multirotor wind turbine which is capable of handling loads originating from gravity acting on the energy generating units, as well as loads originating from thrust of the energy generating units.

According to a first aspect the invention provides a load carrying structure for a multirotor wind turbine, the load carrying structure being arranged for carrying two or more energy generating units of the multirotor wind turbine, and for being connected to a tower structure of the multirotor wind turbine, the load carrying structure comprising:
 a first load carrying arrangement and a second load carrying arrangement, each load carrying arrangement being arranged to carry at least one energy generating unit,
 each load carrying arrangement comprising a primary structure and at least two secondary structures, the secondary structures extending on opposing sides of the primary structure between an energy generating unit carried by the load carrying arrangement and an attachment point at the tower structure,
wherein gravity acting on the energy generating units causes push in the primary structures and pull in the secondary structures, thereby causing preload of the secondary structures.

Thus, the invention relates to a load carrying structure for a multirotor wind turbine, i.e. for a wind turbine comprising two or more energy generating units. The load carrying structure is arranged for carrying two or more energy generating units, and for being connected to a tower structure of the multirotor wind turbine. Accordingly, the load carrying structure forms a connection between the two or more energy generating units and the tower structure, and is capable of handling the loads involved with carrying the energy generating units.

In the present context the term 'energy generating unit' should be interpreted to mean a part of the wind turbine which actually transforms the energy of the wind into electrical energy. Each energy generating unit thereby typically comprises a rotor, carrying a set of wind turbine blades, and a generator. The energy generating unit may further comprise a gear arrangement interconnecting the rotor and the generator. The generator, and possibly the gear arrangement, may be arranged inside a nacelle.

In the present context the term 'tower structure' should be interpreted to mean a substantially vertical structure, arranged to carry the energy generating units of the multirotor wind turbine, at least partly via one or more load carrying structures. It is not ruled out that one or more energy generating units are mounted directly on the tower structure.

The load carrying structure comprises a first load carrying arrangement and a second load carrying arrangement. Each load carrying arrangement is arranged to carry at least one energy generating unit. Accordingly, each load carrying arrangement is arranged to handle the loads involved with carrying their respective energy generating unit(s). Furthermore, the load carrying arrangements may advantageously be arranged on opposing sides of the tower structure, in order to balance forces and loads with respect to the tower structure.

Each load carrying arrangement comprises a primary structure and at least two secondary structures. The secondary structures extend on opposing sides of the primary structure between an energy generating unit carried by the load carrying arrangement and an attachment point at the tower structure. Thereby a longitudinal axis of the tower structure and axes defined by the primary structure and the two secondary structures are not arranged in one plane. Preferably, the axes defined by the primary structure and the two secondary structures are not arranged in the same plane, thereby defining a three-dimensional structure.

This design has the consequence, that when gravity acts on the energy generating unit, this causes push in the primary structures and pull in the secondary structures. This causes the secondary structures to be preloaded, due to gravity acting on the energy generating units. The preloading of the secondary structures ensures that these structures are capable of handling loads originating from thrust of the energy generating units. In particular, since the secondary structures extend on opposing sides of the primary structure, thrust loads acting in one direction will increase the pull in a first secondary structure and decrease the pull in the second secondary structure, while thrust loads acting in an opposite direction will decrease the pull in the first secondary structure and increase the pull in the second secondary structure. However, the preload in the secondary structures ensures that a certain pull remains in each of the secondary structures, also when the pull is decreased, due to the thrust loads. The two opposing directions could, e.g., be the direction of the incoming wind and the opposite direction.

The energy generating units may, e.g., be arranged at extremities of the respective load carrying arrangements, the extremities being arranged furthest away from the tower structure.

The angles defined by each of the secondary structures and the primary structure, in a substantially horizontal plane, may be identical. In this case the preload introduced in the secondary structures, due to gravity acting on the energy generating unit, is substantially identical. This will allow the load carrying structure to handle thrust loads of substantially identical magnitude in the direction of the incoming wind and in an opposite direction.

As an alternative, the angle defined by one secondary structure and the primary structure may differ from the angle defined by the other secondary structure and the primary structure, in a substantially horizontal plane. This will allow the load carrying structure to handle higher thrust loads in one direction than in an opposite direction. For instance, it may be expected that thrust loads along the direction of the incoming wind are higher than thrust loads along the opposite direction. In this case the angles between the secondary structures and the primary structure may advantageously be selected in such a manner that the load carrying structure is capable of handling thrust loads of a higher magnitude along the direction of the incoming wind than along the opposite direction.

The load carrying structure may advantageously be designed in such a manner that collisions between the wind turbine blades of the energy generating units on the one hand, and the primary and secondary structures and the tower structure, on the other hand, are avoided. For instance, the primary structures may extend from the tower structure in a slightly forward direction, i.e. into the incoming wind, thereby positioning the wind turbine blades in front of the tower structure. This also allows the secondary structures, extending on opposing sides of the primary structures, to be attached to the tower structure at a position behind the position of the wind turbine blades.

It is not ruled out that a single tower structure may have two or more load carrying structures of the kind described above mounted thereon. In this case the load carrying structures may advantageously be arranged one above the other along the length of the tower structure.

Each primary structure may be in the form of one or more compression bars. Compression bars are suitable for receiving push. The compression bars could, e.g., be in the form of tubes, rods, beams, such as I-beams, etc.

Each secondary structure may be in the form of one or more tension members. Tension members are suitable for receiving pull. The tension members could, e.g., be in the form bars or carbon fibre structures, or in the form of flexible members, such as wires, ropes, etc.

Each primary structure may extend between a first end and a second end, the first end being attached to a flexure member arranged at or near the tower structure, and at least one energy generating unit being arranged at or near the second end.

According to this embodiment at least one of the energy generating units is arranged at an extremity of each primary structure. The opposite extremity of each primary structure is attached to a flexure member at a position at or near the tower structure. In the present context, the term 'flexure member' should be interpreted to mean a member which allows the primary structures attached thereto to perform movements along at least one direction. Preferably, the flexure member allows the primary structures attached thereto to perform movements along more than one direction. Thus, the flexure member allows the two primary structures attached thereto to perform limited movements with respect to each other. This even further improves the capability of the load carrying structure of handling thrust loads.

The flexure member may be or comprise a spherical joint. As an alternative, the flexure member may be or comprise a flexpin or a tube or rod being capable of flexing slightly, thereby allowing limited movements of the primary structures attached thereto.

The tower structure may define a longitudinal axis, and each of the primary structures may extend away from the tower structure along a direction which is arranged at an acute angle with respect to the longitudinal axis defined by the tower structure. Normally, the longitudinal axis defined by the tower structure extends in a substantially vertical direction. Thus, according to this embodiment, the primary structures extend away from the tower structure along a direction which is not horizontal. Instead, each primary structure extends away from the tower structure in an inclined upwards direction or in an inclined downwards direction. Preferably, the primary structures extend in an inclined upwards direction.

The angle defined between the longitudinal axis defined by the tower structure and the direction defined by the primary structure may be used as a design parameter of the load carrying structure. Decreasing the angle causes an increase in the pull and push forces in the primary and secondary structures, and thereby an increase in the preload of the secondary structures. Similarly, an increase in the angle causes a decrease in the pull and push forces, and thereby a decrease in the preload in the secondary structures. Accordingly, the angle can be selected in such a manner that a desired preload is obtained.

Each of the secondary structures may further extend away from the tower structure along a direction which is arranged substantially perpendicularly to the longitudinal axis defined by the tower structure. Thus, according to this embodiment, the secondary structures extend away from the tower structure along a substantially horizontal direction.

Preferably, the secondary structures of a given load carrying arrangement extend along directions being arranged in a substantially horizontal plane, and the primary structure of the load carrying arrangement extends along a direction which is not arranged in the horizontal plane. Thereby the primary structure and the secondary structures of a given load carrying arrangement define a three-dimensional structure, as described above.

According to one embodiment, for at least one of the load carrying arrangements, a direction defined by a first secondary structure and a direction defined by a second secondary structure span a plane, and the direction defined by the first secondary structure defines a first angle with respect to the direction defined by the primary structure, projected onto the plane, and the direction defined by the second secondary structure defines a second angle with respect to the direction defined by the primary structure, projected onto the plane. Preferably, the first secondary structure and the second secondary structure extend along non-parallel directions.

The first angle may be equal to the second angle. As described above, this will allow the load carrying structure to handle thrust loads of substantially equal magnitude along a direction of the incoming wind and along an opposite direction.

As an alternative, the first angle may differ from the second angle, in which case the load carrying structure will be able to handle higher thrust loads along one direction, e.g. the direction of the incoming wind, than along an opposite direction. This has already been described above.

The secondary structures may have an adjustable length. This allows fine tuning of the secondary structures. For instance, in the case that the secondary structures are in the form of flexible members, such as wires, ropes or the like, the length of the secondary structures may increase during use of the load carrying structure, due to the pull introduced in the secondary structure. In this case it may be desirable to decrease the length of the secondary structures from time to time, in order to ensure that a desired preload is introduced in the secondary structures as gravity acts on the energy generating units. Furthermore, the length of a given secondary structure may be adjusted in such a manner that the secondary structure has one length during installation or erection of the wind turbine and another length during operation of the wind turbine.

As an alternative, the secondary structures may be designed with a sufficient flexibility to ensure that a desired preload is introduced in the secondary structures as gravity acts on the energy generating units. Or a movable joint may be introduced in the secondary structures in order to ensure this.

Each load carrying arrangement may be attached to the tower structure via a yaw arrangement. According to this embodiment, the load carrying structure is allowed to perform yawing movements with respect to the tower structure, thereby allowing the rotors of the energy generating units to be directed into the incoming wind.

Two of the load carrying arrangements may be connected to each other at one side of the tower structure. According to this embodiment, the load carrying structure 'passes' the tower structure on one side of the tower structure. Thereby the distance between the two load carrying arrangements is very short, and accordingly the distance which any forces being transferred between the two load carrying arrangements travels is also short. This even further improves the capability of the load carrying structure of handling thrust loads.

At least one energy generating unit may be mounted on a load carrying arrangement in such a manner that a centre of mass of the energy generating unit substantially coincides with an attachment point between the energy generating unit and the load carrying arrangement, the attachment point further being a point of transfer of thrust loads from the energy generating unit to the load carrying arrangement.

According to this embodiment, the gravity acting on the energy generating unit has a point of attack which substantially coincides with the position where the energy generating unit is attached to the load carrying structure, i.e. the point where the load carrying structure supports the energy generating unit. Thereby tilting of the energy generating unit, due to gravity acting on the energy generating unit, is minimised or even eliminated. This considerably reduces the risk of torsion vibrations being introduced into the load carrying structure, and the magnitude of possible torsion vibrations of the load carrying structure is minimised.

Furthermore, the attachment point of the energy generating unit to the load carrying structure is also the point of transfer of thrust loads from the energy generating unit to the load carrying structure. Therefore the capability of the load carrying structure of handling thrust loads is even further improved.

According to a second aspect, the invention provides a multirotor wind turbine comprising a tower structure having at least one load carrying structure according to the first aspect of the invention connected thereto. Accordingly, the remarks set forth above are equally applicable here.

According to a third aspect the invention provides a method for erecting a multirotor wind turbine comprising a tower structure and at least one load carrying structure according to the first aspect of the invention, the method comprising the steps of:
  erecting the tower structure,
  arranging a load carrying structure at a base of the tower structure with a first load carrying arrangement and a second load carrying arrangement extending away from the tower structure on opposing sides of the tower structure, the first load carrying arrangement and the second load carrying arrangement each having at least part of at least one energy generating unit mounted thereon,
  attaching each of the secondary structures of each of the load carrying arrangements to the tower structure,
  adjusting the lengths of at least some of the secondary structures until a centre of mass of the first load carrying arrangement and a centre of mass of the second load carrying arrangement are interconnected by a line which passes the tower structure at a distance from a centre line of the tower structure which is between 0% and 150% of a radius of the tower structure, and
  hoisting the load carrying structure along the tower structure to an operating level.

In the method according to the third aspect of the invention, the tower structure is initially erected. Next, a load carrying structure with a first load carrying arrangement and a second load carrying arrangement, i.e. of the kind described above with reference to the first aspect of the invention, is arranged at a base of the tower structure. The load carrying structure is positioned in such a manner that the first load carrying arrangement and the second load carrying arrangement extend away from the tower structure on opposing sides of the tower structure.

The first load carrying arrangement and the second load carrying arrangement each has at least part of at least one energy generating unit mounted thereon. This significantly increases the total weight of the load carrying arrangements, as will be described further below. For instance, each load carrying arrangement could have a complete energy generating unit, including a nacelle and a rotor carrying a complete set of wind turbine blades, mounted thereon. As an alternative, only part of an energy generating unit may be mounted on each load carrying arrangement, such as only a nacelle, only a nacelle and a rotor, or only a nacelle, a rotor and some of the wind turbine blades.

Next, each of the secondary structures of each of the load carrying arrangements is attached to the tower structure. Thus, for each secondary structure, one end is attached at an attachment point on the tower structure, and another end is attached to the corresponding primary structure at a position near the energy generating unit.

Then the lengths of at least some of the secondary structures are adjusted until a centre of mass of the first load carrying arrangement and a centre of mass of the second load carrying arrangement are interconnected by a line which passes the tower structure at a distance from a centre line of the tower structure which is between 0% and 150% of a radius of the tower structure, such as between 0% and 125% of the radius, such as between 0% and 100% of the radius, such as between 0% and 50% of the radius. In the case that the line passes the tower structure at a distance which is between 0% and 100% of the radius of the tower structure, the line actually intersects the tower structure.

Each of the load carrying arrangements define a centre of mass, based on the combined mass of the primary structure, the secondary structures and the energy generating unit, or part of energy generating unit, carried by the load carrying arrangement. The contribution to the combined mass which originates from the energy generating unit by far exceeds the contributions originating from the primary structure and the secondary structures. Therefore the position of the energy generating unit, or part of the energy generating unit, has a significant impact on the position of the centre of mass of the load carrying arrangement.

When the lengths of the secondary structures are adjusted, the orientations of the primary structures with respect to the tower structure are also adjusted, because the secondary structures interconnect a part of the corresponding primary structure and the tower structure. Since the energy generating units are mounted on the primary structures, this will move the positions of the energy generating units relative to the tower structure. Accordingly, the positions of the centres of mass of the load carrying arrangements are also moved relative to the tower structure.

It is an advantage that the centres of mass of the load carrying arrangements are moved to a position where a line interconnecting them intersects the tower structure, or passes the tower structure close to the tower structure, such as within a distance from the centre line of the tower structure which is between 0% and 150% of the radius of the tower structure, because thereby the load carrying structure is balanced with respect to the tower structure, and it can be hoisted in a balanced along the tower structure. Accordingly, this position of the load carrying arrangements is suitable during erection of the wind turbine, in particular during hoisting of the load carrying arrangement along the tower structure to an operating level.

Thus, the load carrying structure is finally hoisted along the tower structure to an operating level.

The method may further comprise the step of re-adjusting the lengths of at least some of the secondary structures when the load carrying structure has been hoisted to the operating level, until the line interconnecting the centre of mass of the first load carrying arrangement and the centre of mass of the second load carrying arrangement does not intersect the tower structure.

According to this embodiment, once the load carrying structure has reached the operating level, and the hoisting has thereby been completed, the lengths of at least some of the secondary structures are once again adjusted until the line interconnecting the centres of mass does not intersect the tower structure. Thereby the centres of mass of the load carrying arrangements will be arranged on the same side of the tower. This will position the rotors and the wind turbine blades at a position where they are well clear of the primary structure, the secondary structures and the tower structure, thereby minimising the risk of collisions during operation. Accordingly, this position is suitable during normal operation of the wind turbine. Thus, according to this embodiment, the secondary structures are adjusted to an 'installation position' during erection of the wind turbine, notably during hoisting of the load carrying structure, and to an 'operating position' upon completion of the erection of the wind turbine.

The step of adjusting the lengths of at least some of the secondary structures may comprise increasing the length of a first secondary structure of each of the load carrying arrangements and/or decreasing the length of a second secondary structure of each of the load carrying arrangements. Since the secondary structures of a given load carrying arrangement extend on opposing sides of the primary structure, increasing the length of one secondary structure and decreasing the length of the other will move the primary structure, and thereby the position of the energy generating unit and the centre of mass, in the same direction.

The step of adjusting the lengths of at least some of the secondary structures may result in the centre of mass of the first load carrying arrangement and the centre of mass of the second load carrying arrangement to move in parallel directions. According to this embodiment, the adjustment of the lengths of the secondary structures of the first load carrying arrangement is coordinated with the adjustment of the lengths of the secondary structures of the second load carrying arrangement. For instance, if the centres of mass of the load carrying arrangements are arranged on the same side of the tower structure, the lengths of the secondary structures may be adjusted in such a manner that the centres of mass are moved along parallel directions, towards the tower structure.

The step of adjusting the lengths of at least some of the secondary structures may result in the centre of mass of the first load carrying arrangement and the centre of mass of the second load carrying arrangement to move in a direction having a horizontal component and a downwardly directed component. According to this embodiment, the centres of mass of the load carrying arrangements are moved horizontally, e.g. in a direction towards the tower structure, as well as downwards. Thereby a lifting point which is above the centres of mass of the load carrying arrangements can be achieved. This further improves the balance.

The step of hoisting the load carrying structure may be performed using a jacking mechanism. According to this embodiment, no external crane is required in order to hoist the load carrying structure to the operating level. Furthermore, a jacking mechanism will normally be mounted on the tower structure, and therefore contact points between the load carrying arrangements and the jacking mechanism will be positioned at or near the line which interconnects the centres of mass of the load carrying arrangements.

According to a fourth embodiment the invention provides a method for handling a load carrying structure according to the first aspect of the invention, the method comprising the steps of:

arranging the load carrying structure adjacent to a yaw arrangement with a first load carrying arrangement and a second load carrying arrangement extending away from the yaw arrangement on opposing sides of the yaw arrangement, the first load carrying arrangement and the second load carrying arrangement each having at least part of at least one energy generating unit mounted thereon, attaching each of the secondary structures of each of the load carrying arrangements to the yaw arrangement, and adjusting the lengths of at least some of the secondary structures until a centre of mass of the first load carrying arrangement and a centre of mass of the second load carrying arrangement are interconnected by a line which passes the yaw arrangement at a distance from a centre line of the yaw arrangement which is between 0% and 150% of a radius of the yaw arrangement.

The method according to the fourth aspect of the invention is very similar to the method according to the third aspect of the invention, and it will therefore not be described in detail here. However, in the method according to the fourth aspect of the invention, the secondary structures of the load carrying arrangements are attached to a yaw arrangement, which is not necessarily connected to a tower structure, even though this is not ruled out. This allows for separate handling of the load carrying structure and the yaw arrangement, e.g. with the purpose of transporting the load carrying arrangement to an operating site of a wind turbine.

Since the centres of mass of the load carrying arrangements are positioned in such a manner that the line interconnecting the centres of mass intersects the yaw arrangement, or passes close by the yaw arrangement, the load carrying structure can be lifted in a stable and balanced manner by lifting the yaw arrangement.

The method may further comprise the step of hoisting the yaw arrangement and the load carrying structure along a tower structure to an operating level. According to this embodiment, the load carrying structure is further hoisted to an operating level on a tower construction by lifting the yaw arrangement.

BRIEF DESCRIPTION OF THE DRAWINGS

The invention will now be described in further detail with reference to the accompanying drawings in which.

DETAILED DESCRIPTION OF THE DRAWINGS

Figure 1:
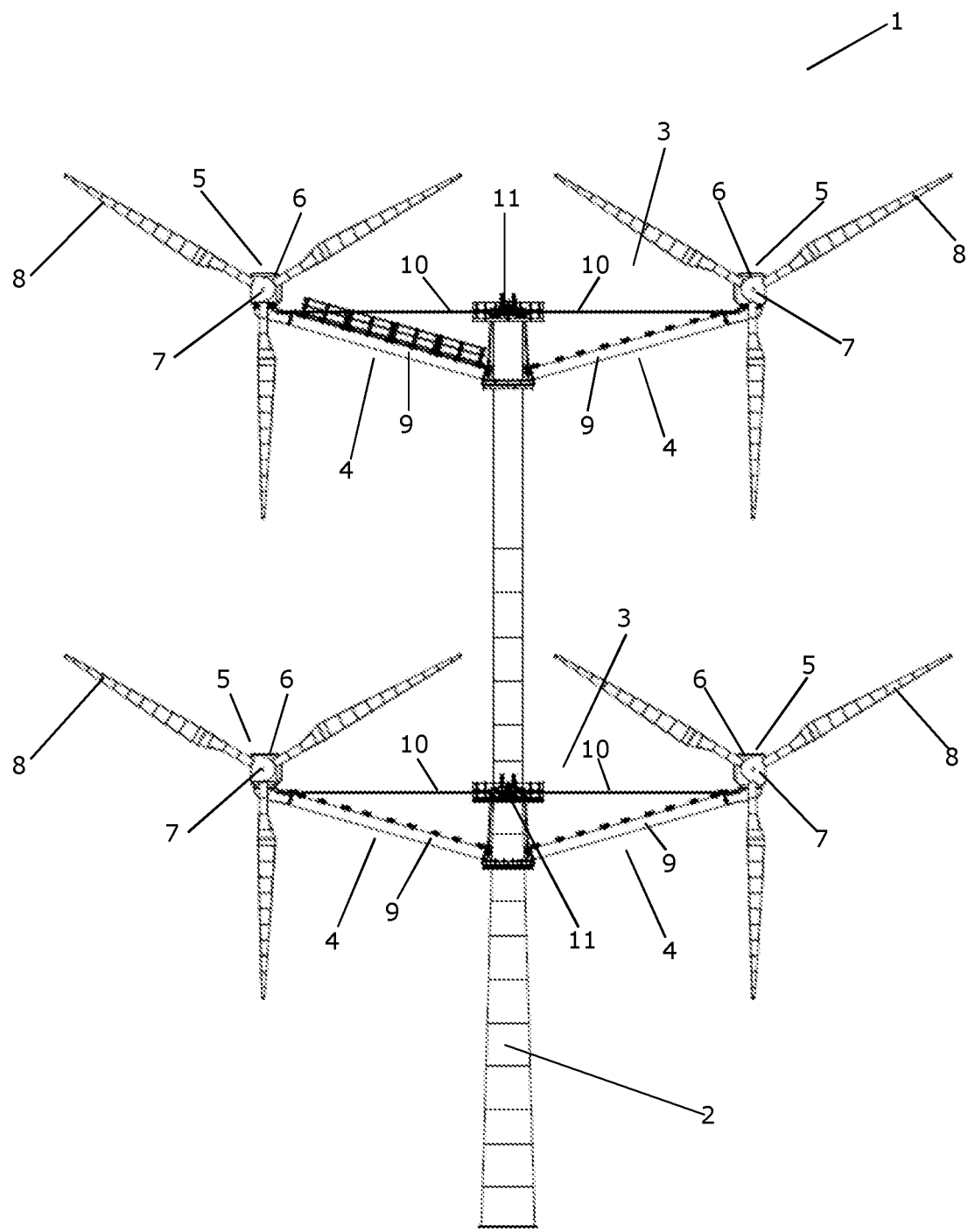
FIG. 1 is a front view of a multirotor wind turbine comprising two load carrying structures according to an embodiment of the invention.

FIG. 1 is a front view of a multirotor wind turbine 1 comprising a tower structure 2 carrying two load carrying structures 3 according to an embodiment of the invention. The load carrying structures 3 are arranged, one above the other, along the length of the tower structure 2.

Each load carrying structure 3 comprises two load carrying arrangements 4, extending away from the tower structure 2 on opposite sides of the tower structure 2, as seen from the viewing angle of FIG. 1. Each load carrying arrangement 4 carries an energy generating unit 5, each energy generating unit 5 comprising a nacelle 6 and a rotor 7 carrying three wind turbine blades 8.

Each load carrying arrangement 4 comprises a primary structure 9, in the form of a tube, and two secondary structures 10, in the form of double wires. In FIG. 1, only one of the secondary structures 10 for each load carrying arrangement 4 is visible.

The primary structures 9 extend away from the tower structure 2 along a direction which forms an acute angle with respect to a substantially vertical longitudinal axis defined by the tower structure 2. Thereby the primary structures 9 extend away from the tower structure 2 along an inclined upwards direction.

The secondary structures 10 extend away from the tower structure 2 along a direction which is substantially perpendicular to the substantially vertical longitudinal axis defined by the tower structure 2. Thereby the secondary structures 10 extend away from the tower structure 2 along a substantially horizontal direction. Accordingly, an angle is defined between the direction in which primary structure 9 of a given load carrying arrangement 4 extends, and the plane in which the secondary structures 10 of the load carrying arrangement 4 extend.

The secondary structures 10 are attached to the tower structure 2 via a yaw arrangement 11, allowing the entire load carrying structure 3 to perform yawing movements with respect to the tower structure 2 in order to direct the rotors 7 into the incoming wind.

The primary structures 9 are connected to a flexure member being arranged behind the tower structure 2, along the viewing direction of FIG. 1, and it is therefore not visible in FIG. 1. The flexure member is arranged to allow the primary structures 9 to move relative to the flexure member, and is thereby capable of absorbing small movements of the primary structures 9 without transferring these movements to the tower structure 2. The flexure member will be described in further detail below with reference to FIGS. 4 and 5.

Accordingly, the primary structures 9 of a given load carrying structure 3 and the secondary structures 10 of the load carrying structure 3 are attached to the tower structure 2 at separate positions along the length of the tower structure 2.

When gravity acts on the energy generating units 5, the mutual positions of the primary structures 9 and the secondary structures 10 causes push in the primary structures 9 and pull in the secondary structures 10. Thereby a preload is introduced in the secondary structures 10, due to the gravity acting on the energy generating units 5.

During operation of the multirotor wind turbine 1, thrust forces will act on the energy generating units 5, in the direction of the incoming wind or in the opposite direction. When this occurs, the pull in one of the secondary structures 10 of each of the load carrying arrangements 4 is decreased while the pull in the other secondary structure 10 is increased. However, the preload introduced in the secondary structures 10, due to gravity acting on the energy generating units 5, is sufficiently high to ensure that the secondary structure 10, in which the pull is decreased, remains tight. Accordingly, the load carrying structure 1 is capable of handling the thrust forces introduced during operation of the multirotor wind turbine 1.

Figure 2:
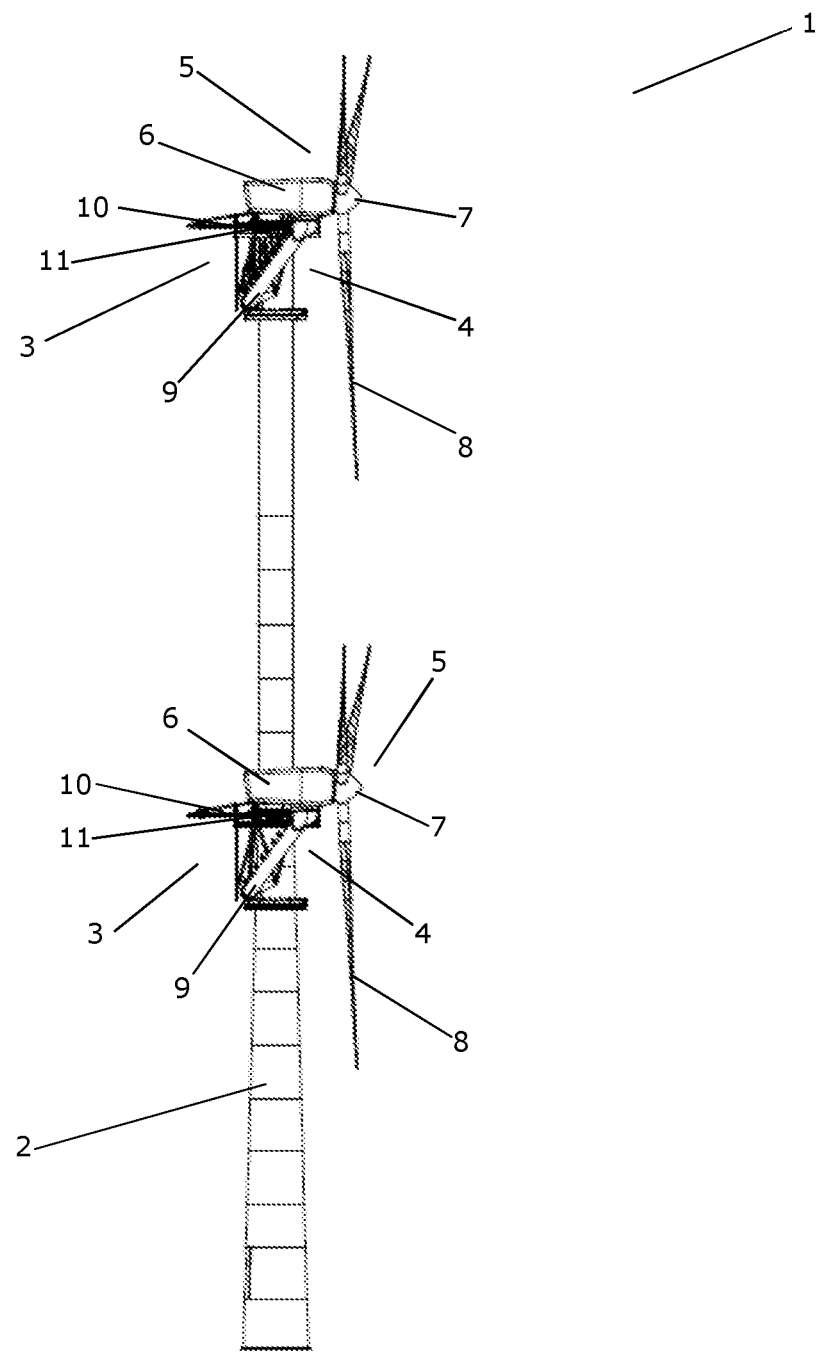
FIG. 2 is a side view of the multirotor wind turbine of FIG. 1.

FIG. 2 is a side view of the multirotor wind turbine 1 of FIG. 1. It can be seen in FIG. 2 that the primary structures 9 extend from a position behind the tower structure 2 to a position in front of the tower structure 2, thereby positioning the rotors 7 of the energy generating units 5 in front of the tower structure 2, and facing the incoming wind.

It can further be seen that one of the secondary structures 10 of each load carrying arrangement 4 extends from an attachment point behind the tower structure 2 to the position of the energy generating unit 5. This will be described in further detail below with reference to FIG. 3.

Figure 3:
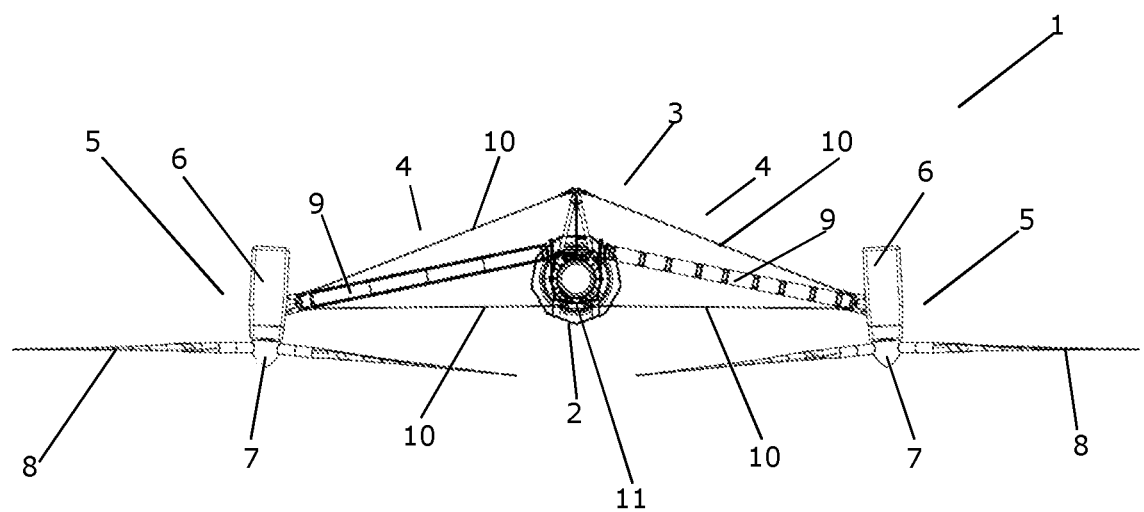
FIG. 3 is a top view of the multirotor wind turbine of FIGS. 1 and 2, FIGS. 4-7 show details of the multirotor wind turbine of FIGS. 1-3, FIGS. 8-10 show a load carrying structure according to an embodiment of the invention from various angles during normal operation.

FIG. 3 is a top view of the multirotor wind turbine 1 of FIGS. 1 and 2. In FIG. 3 it can be seen that each load carrying arrangement 4 comprises two secondary structures 10, and that the secondary structures 10 extend on opposing sides of the primary structure 9 from the position of the energy generating unit 5 to respective attachment points at the tower structure 2. This, combined with the fact that the primary structures 9 extend in an inclined upwards direction, as described above with reference to FIG. 1, has the consequence that the primary structure 9 and the secondary structures 10 of each load carrying arrangement 4 form a three-dimensional structure, which ensures that an appropriate preload is introduced in the secondary structures 10, due to gravity acting on the energy generating unit 5.

For each load carrying arrangement 4, one of the secondary structures 10 is attached to the tower structure 2 via an attachment point arranged on a spacer arrangement 12, the attachment point thereby being arranged behind the tower structure 2 and at a distance from the tower structure 2. The other secondary structure 10 is attached to the tower structure 2 at an attachment point which is arranged in front of the tower structure 2 and close to the tower structure 2. As described above with reference to FIG. 2, the primary structure 9 extends from a position behind the tower structure 2 to a position in front of the tower structure 2. This allows the rotor 7 of each of the energy generating units 5 to be arranged in front of the tower structure 2, and in front of the primary structure 9 and both of the secondary structures 10. Thereby the wind turbine blades 8 are kept clear from these structures, and the risk of collision is minimised.

Figure 4:
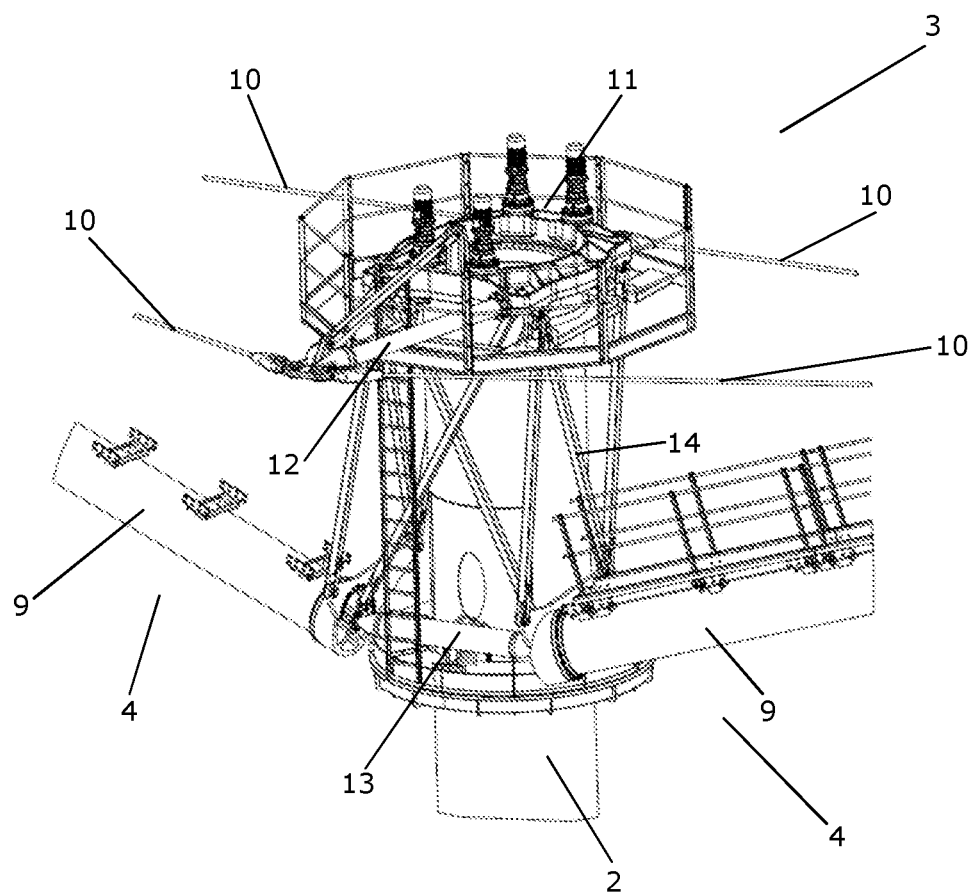

FIG. 4 shows a detail of the multirotor wind turbine 1 of FIGS. 1-3, illustrating the attachment of a load carrying structure 3 to the tower structure 2. It can be seen that one of the secondary structures 10 of each load carrying arrangement 4 is attached to the spacer arrangement 12. The spacer arrangement 12 is, in turn, attached to a movable part of the yaw arrangement 11. The other secondary structure 10 of each load carrying arrangement 4 is attached directly to the movable part of the yaw arrangement 11.

The primary structure 9 of each load carrying arrangement 4 is connected to a flexure member 13 arranged to allow the primary structures 9 to perform movements with respect to the flexure member 13. The primary structures 9 are further connected to a bracket system 14 which interconnects the primary structures 9 and the yaw arrangement 11. The bracket system 14 comprises a number of beams providing a required stiffness and stability of the bracket system 14 to allow the entire load carrying structure 3 to be rotated with respect to the tower structure 2 by means of the yaw arrangement 11.

Figure 5:
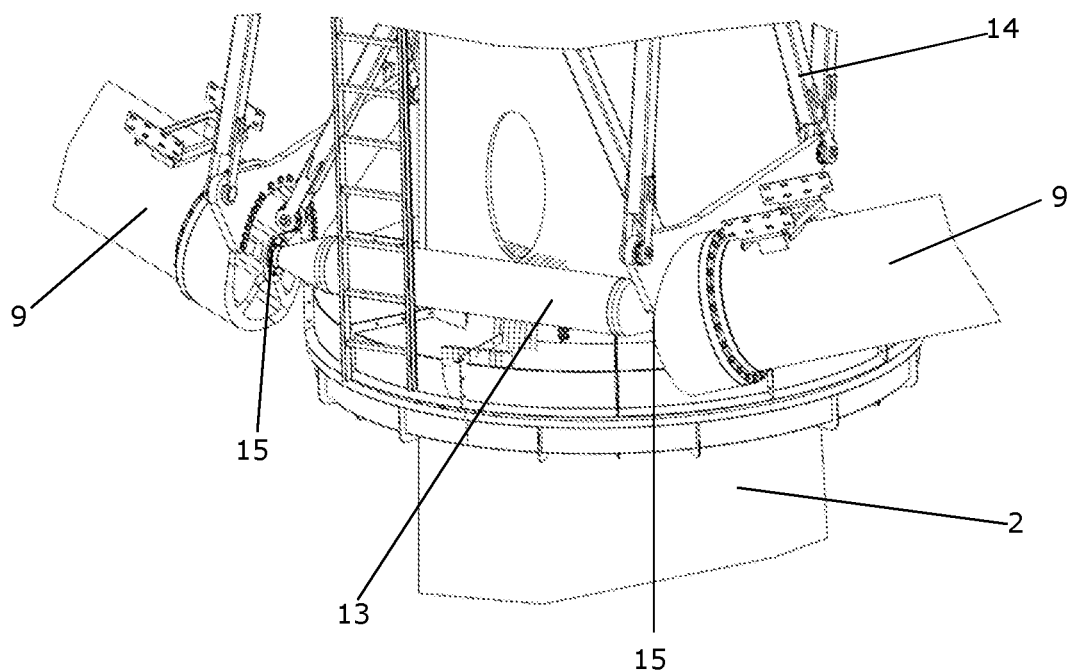

FIG. 5 shows the flexure member 13 in further detail. Each primary structure 9 is connected to the flexure member 13 via a flexible coupling 15, allowing the primary structure 9 to perform movements relative to the flexure member 13. Accordingly, the two primary structures 9 which are connected to the flexure member 13 are not fixed relative to each other. This improves the capability of the load carrying structure 3 to handle thrust loads.

Figure 6:
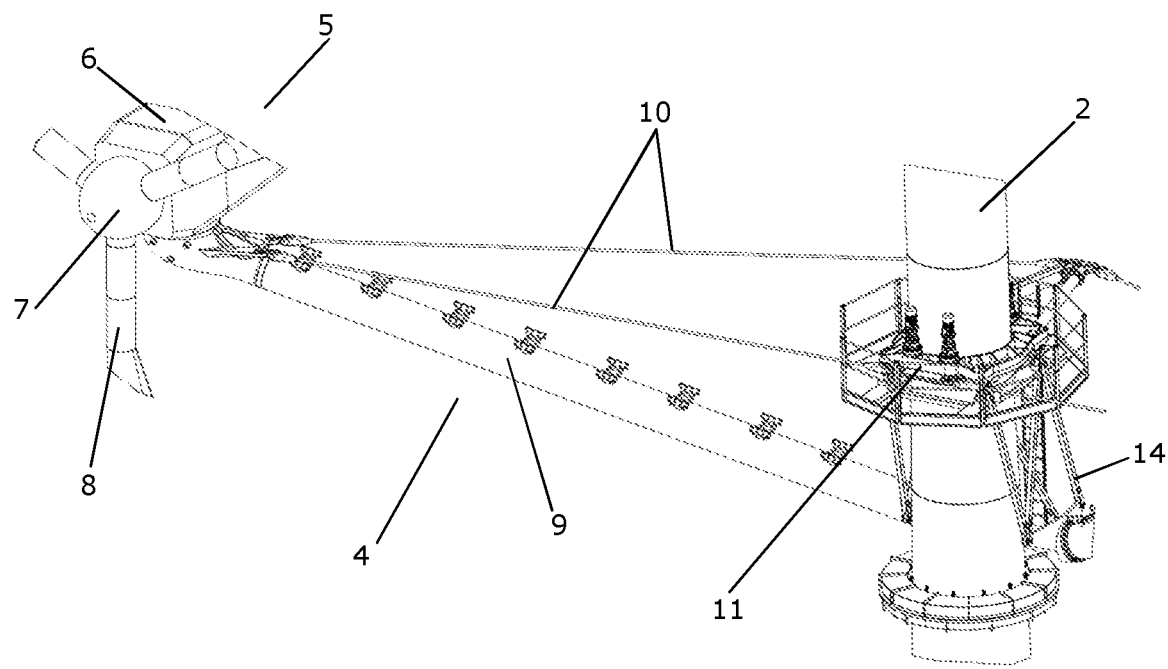

FIG. 6 shows a detail of the multirotor wind turbine 1 of FIGS. 1-3, showing one of the load carrying arrangements 4 in a perspective view. It can be seen that the secondary structures 10 are attached to the primary structure 9 at a position near the energy generating unit 5, and that they extend towards the tower structure 2 along non-parallel directions. It is also clear from FIG. 6 that the primary structure 9 and the secondary structures 10 define a three-dimensional structure, i.e. the primary structure 9 and the secondary structures 10 extend along directions which are not contained in one plane.

Figure 7:
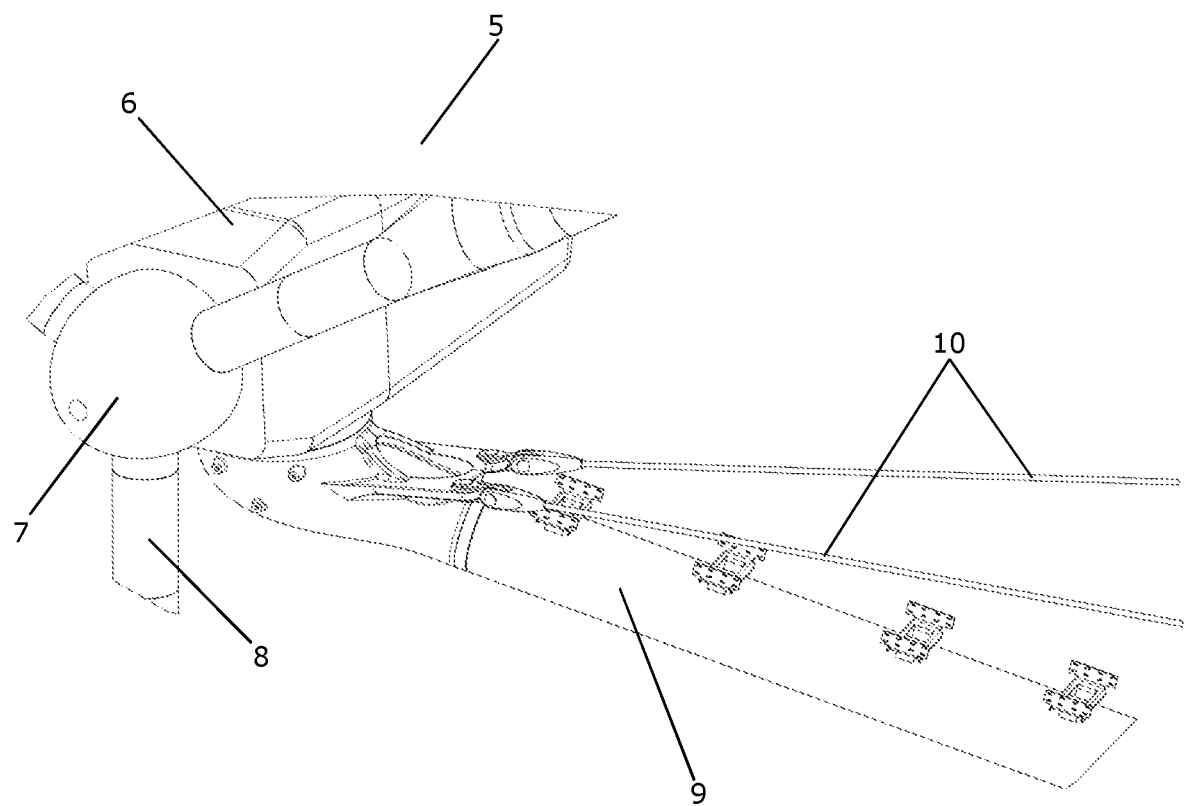

FIG. 7 shows the connection of the secondary structures 10 at the energy generating unit 5 in further detail.

Figure 8:
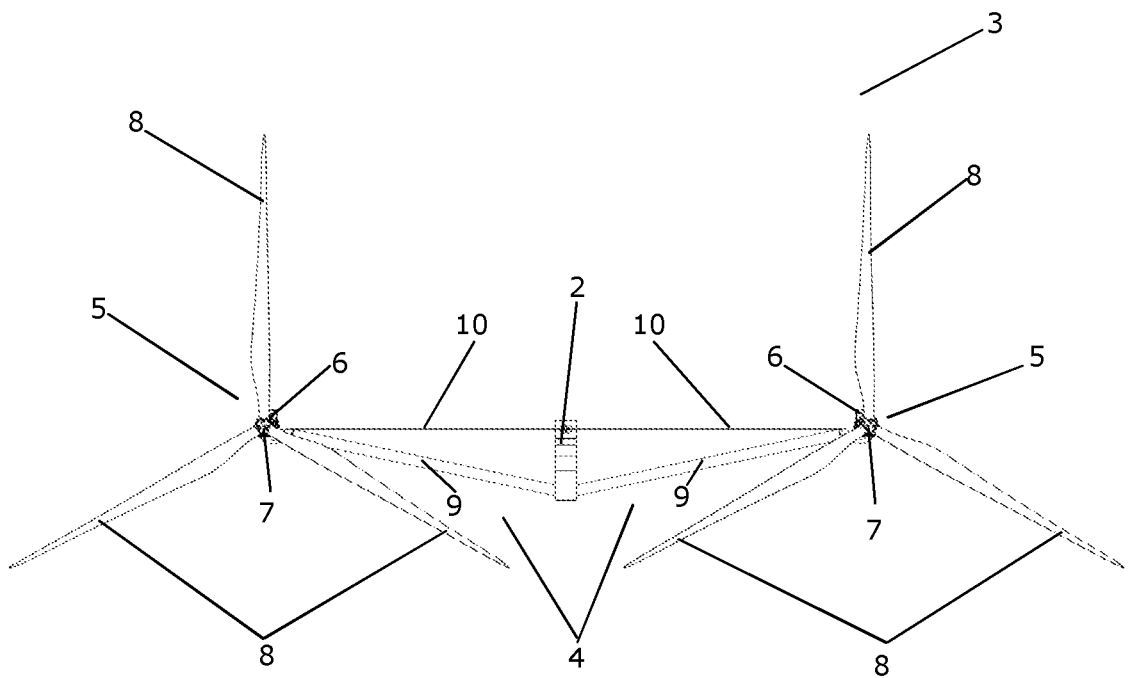

FIG. 8 is a front view of a load carrying structure 3 according to an embodiment of the invention. The load carrying structure 3 of FIG. 8 is very similar to the load carrying structure 3 shown in FIGS. 1-7, and it will therefore not be described in detail here.

The load carrying structure 3 comprises two load carrying arrangements 4, each comprising a primary structure 9 and two secondary structures 10, as described above with reference to FIGS. 1-7. Furthermore, each load carrying arrangement 4 carries an energy generating unit 5 comprising a nacelle 6 and a rotor 7 carrying three wind turbine blades 8.

Each of the load carrying arrangements 4 defines a centre of mass, based on the combined mass of the primary structure 9, the secondary structures 10 and the energy generating unit 5 carried by the load carrying arrangement 4. The contribution to the combined mass which originates from the energy generating unit 5 by far exceeds the contributions originating from the primary structure 9 and the secondary structures 10. Therefore the position of the energy generating unit 5 has a significant impact on the position of the centre of mass of the load carrying arrangement 4.

The lengths of the secondary structures 10 are adjustable, and the orientation of the primary structures 9 and the secondary structures 10 can be adjusted by adjusting the lengths of the secondary structures 10. Since the energy generating units 5 are mounted on the primary structures 9, as described above with reference to FIGS. 1-7, the positions of the energy generating units 5 are also adjusted when the lengths of the secondary structures 10 are adjusted. Accordingly, the positions of the centres of mass of the load carrying arrangements 4 are also adjusted.

In FIG. 8 the secondary structures 10 have each been adjusted to a length which positions the energy generating units 5 in an operating position, i.e. in a position which is suitable during normal operation of the wind turbine. This will be described further below with reference to FIGS. 9 and 10.

Figure 9:
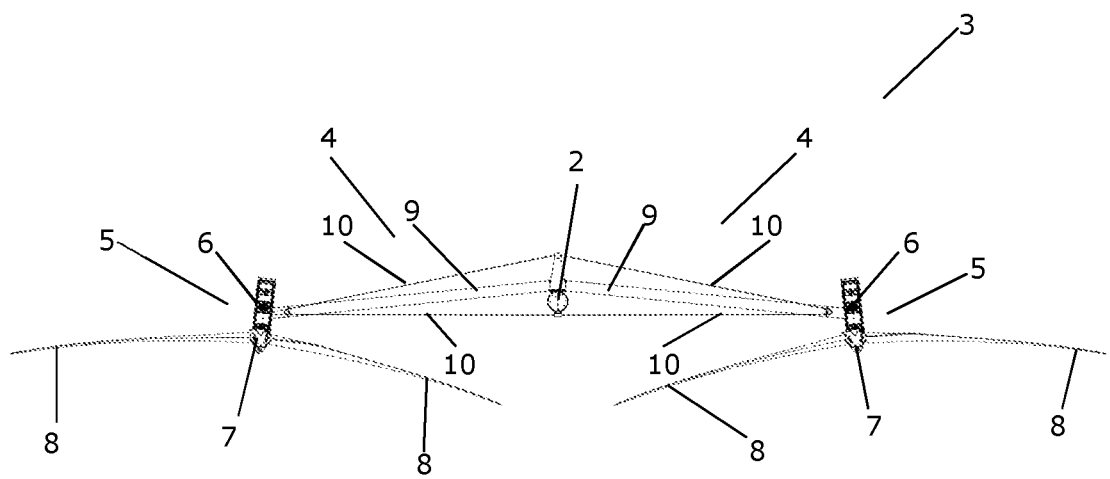

FIG. 9 is a top view of the load carrying structure 3 of FIG. 8. It can be seen that the primary structures 9 extend from a position behind a tower structure 2, onto which the load carrying structure 2 is mounted, to a position in front of the tower structure 2, as described above with reference to FIGS. 2 and 3, thereby positioning the rotor 7 of each energy generating unit 5 in front of the tower structure 2, and in front of the primary structure 9 and the secondary structures 10 of the corresponding load carrying arrangement 4. Thereby the wind turbine blades 8 are kept clear from these structures, minimising the risk of collisions during normal operation. Accordingly, this position is suitable for use during normal operation of the multirotor wind turbine.

The position of the energy generating units 5 of the load carrying structure 3 of FIG. 9 causes the centres of mass of the two load carrying arrangements 4 to be positioned in front of the tower structure 2. Accordingly, an imaginary line which interconnects the centre of mass of one of the load carrying arrangements to the centre of mass of the other load carrying arrangement 4 will pass in front of the tower structure 2, and will therefore not intersect the tower structure 2. This is a disadvantage during erection of the wind turbine, in particular during hoisting of the load carrying structure 3 along the tower structure 2, because the load carrying structure will be out of balance with the tower structure. Accordingly, this position of the energy generating units 5 is not very suitable during installation or erection of the wind turbine.

Figure 10:
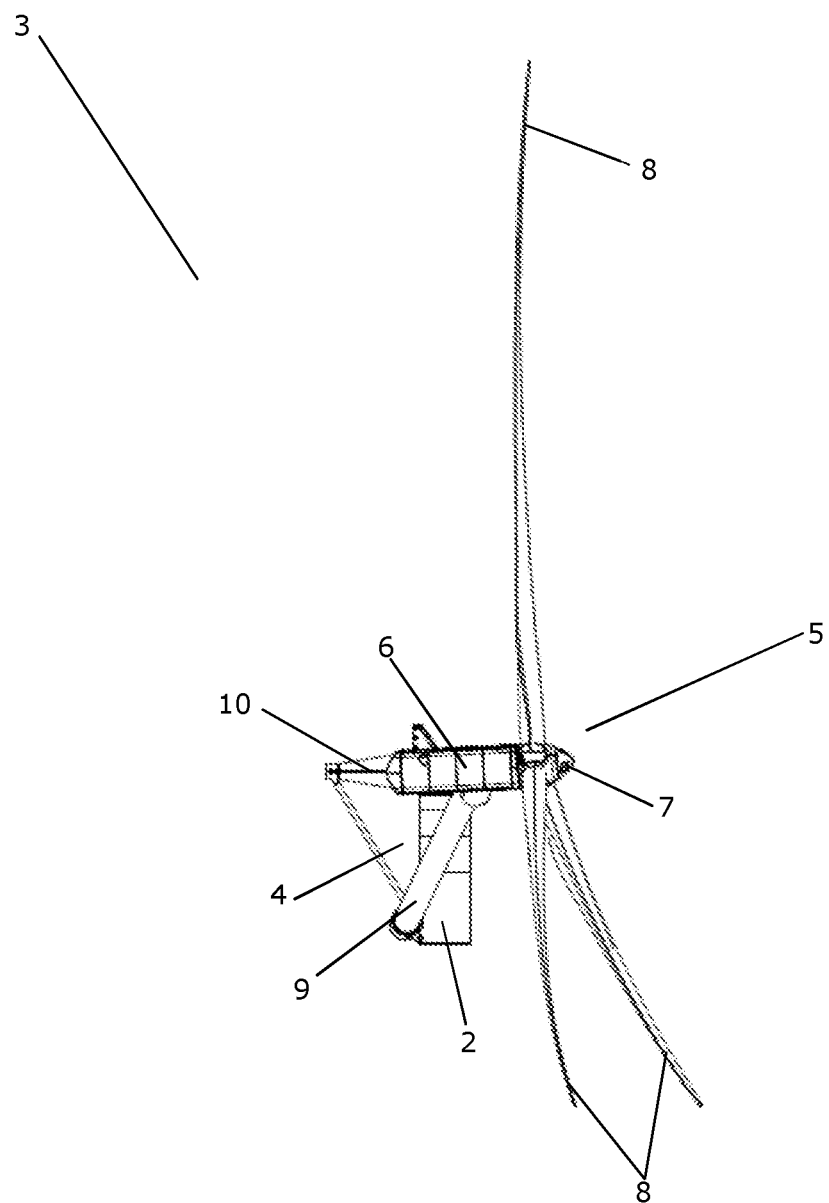

FIG. 10 is a side view of the load carrying structure 3 of FIGS. 8 and 9. It can be clearly seen that the primary structures 9 extend from a position behind the tower structure 2 to a position in front of the tower structure 2, positioning the rotors 7 of the energy generating units 5 clear from the tower structure 2, primary structures 9 and secondary structures 10.

Figure 11:
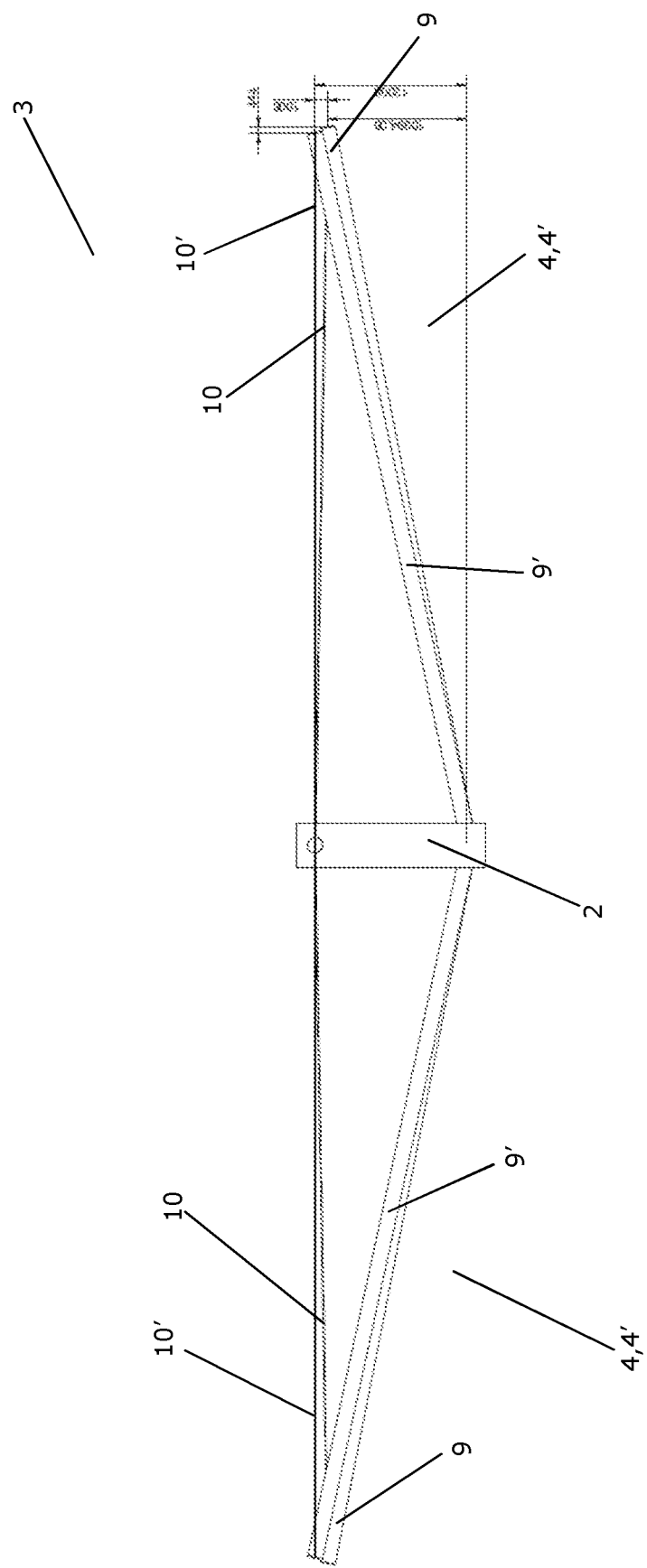
FIGS. 11-14 show the load carrying structure of FIGS. 8-10 from various angles during erection of a multirotor wind turbine.
Figure 12:
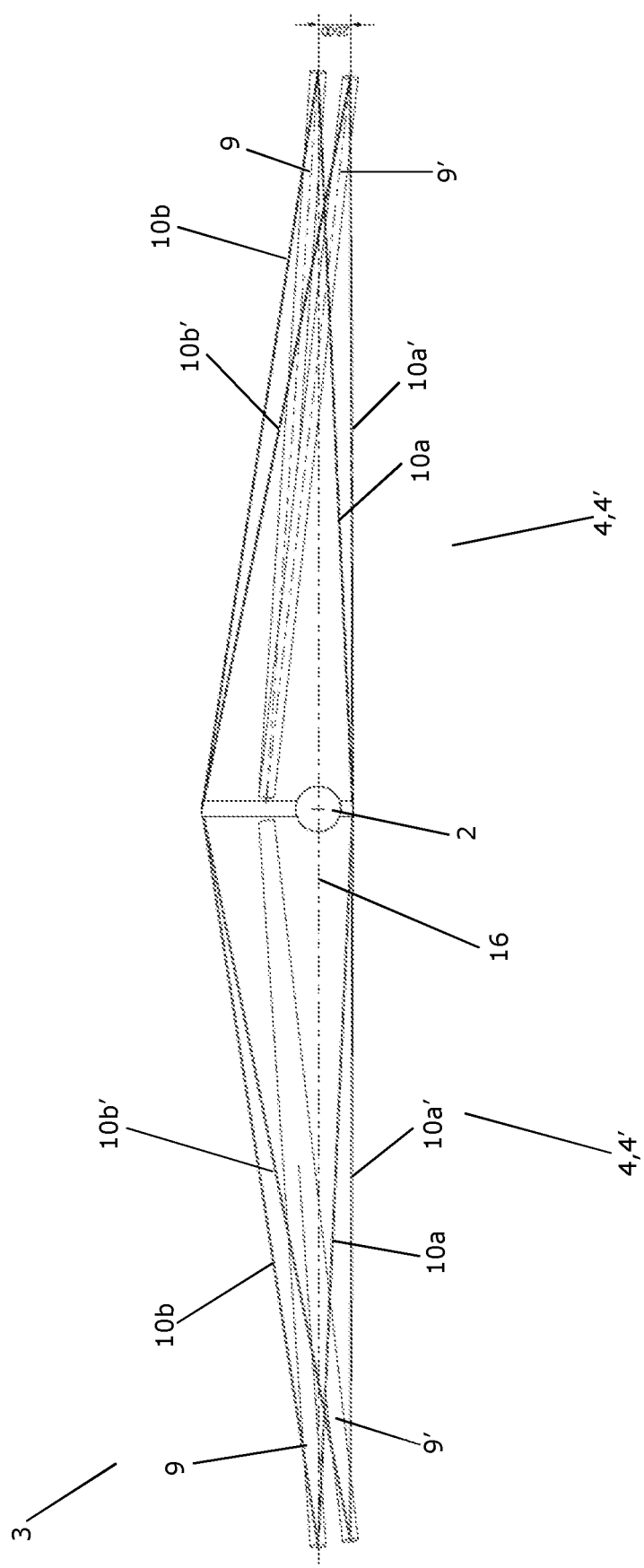
Figure 13:
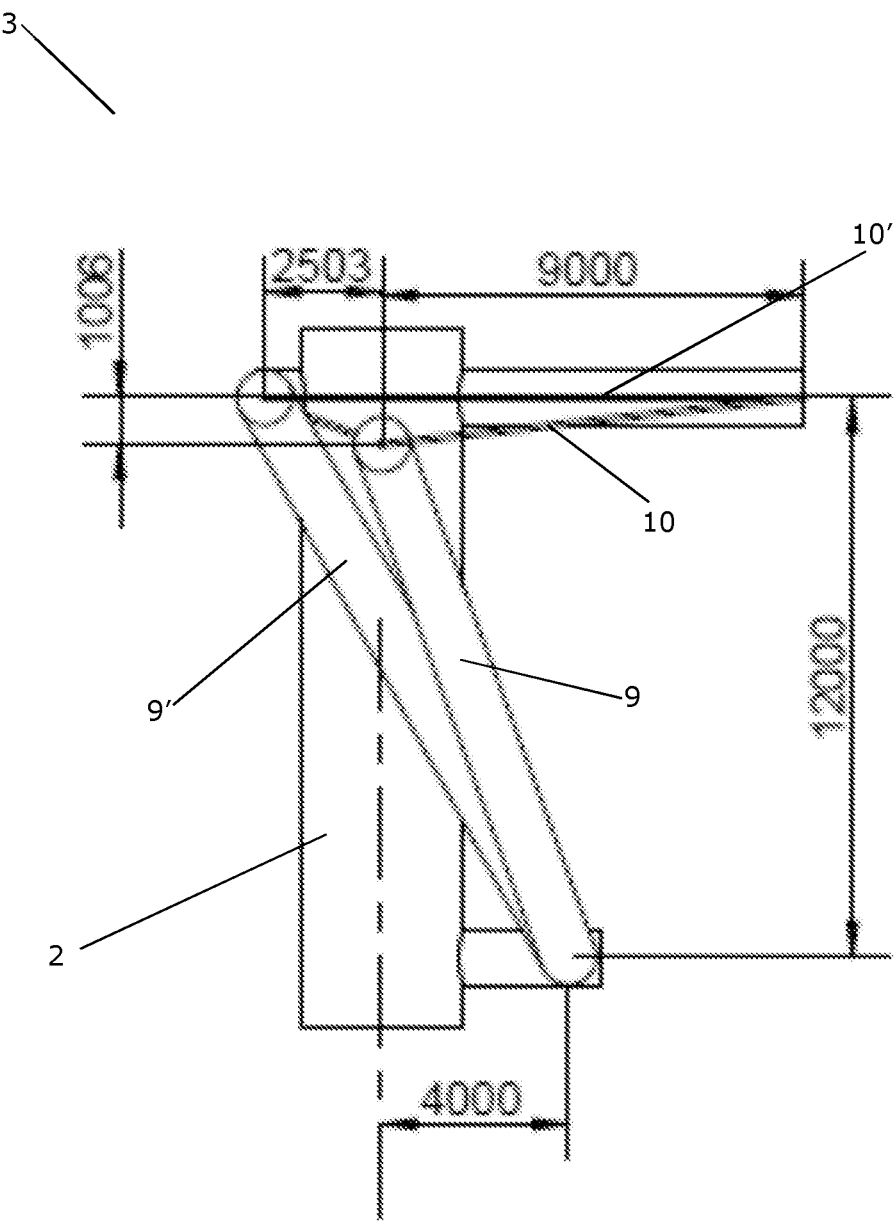
Figure 14:
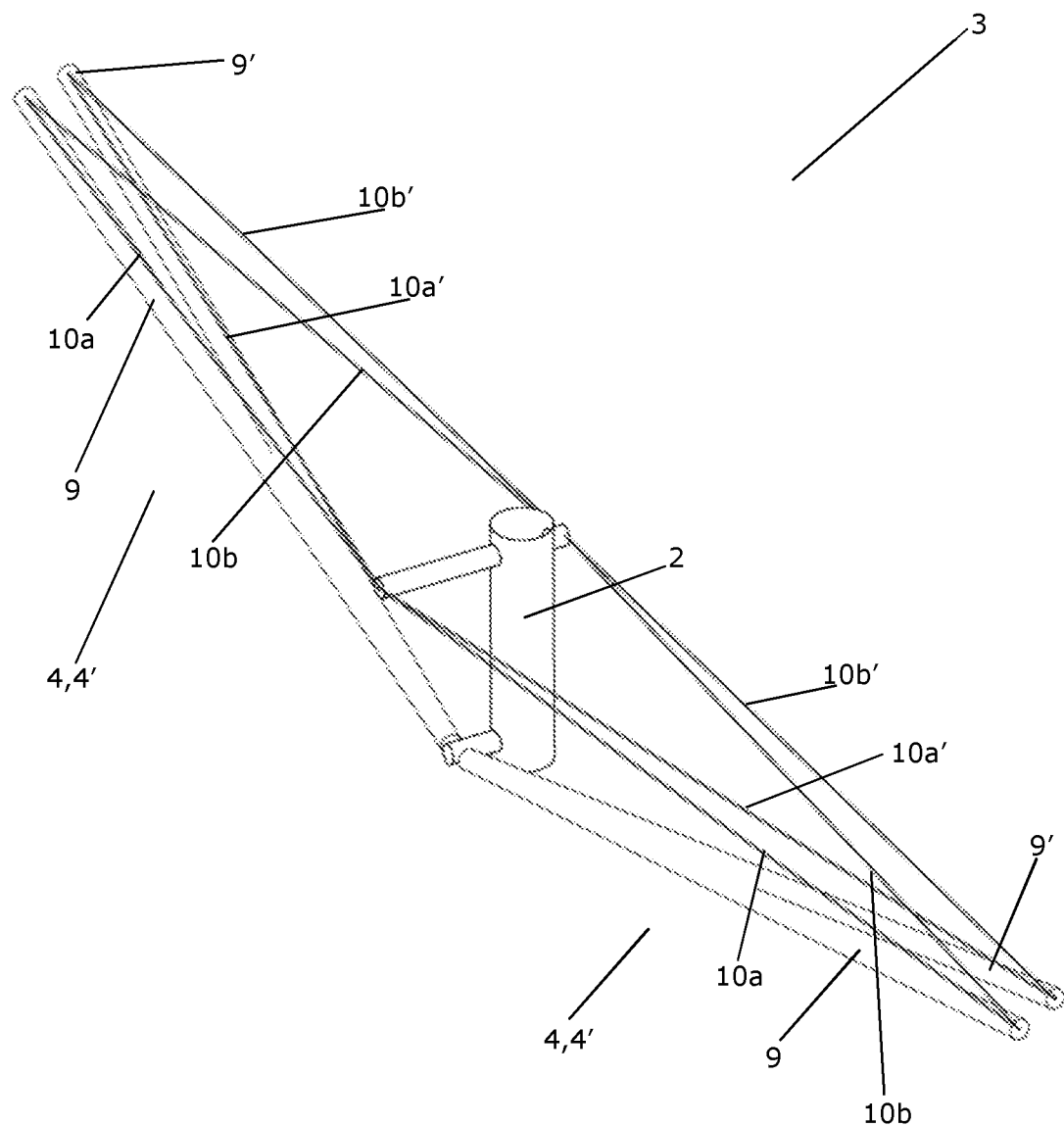

FIGS. 11-14 show the load carrying structure 3 of FIGS. 8-10 from various angles. FIG. 11 is a front view, corresponding to the view of FIG. 8, FIG. 12 is a top view, corresponding to the view of FIG. 9, FIG. 13 is a side view, corresponding to the view of FIG. 10, and FIG. 14 is a perspective view.

It is noted that, for the sake of clarity, the energy generating units have been omitted in FIGS. 11-14. It should, however, be understood that these are in reality present.

As compared to the situation illustrated in FIGS. 8-10 and described above, the lengths of the secondary structures 10 have been adjusted in the situation illustrated in FIGS. 11-14. More specifically, the length of a first secondary structure 10a of each load carrying arrangement 4 has been increased, and the length of a second secondary structure 10b of each load carrying arrangement 4 has been decreased. As a result, the orientation of each of the primary structures 9 has been changed. In order to illustrate this, the positions of the primary structures 9 and secondary structures 10 of FIGS. 8-10 are also shown in FIGS. 11-14, the reference numerals for these positions being marked by a 'prime'.

It can be seen in FIGS. 11-14 that the adjustment of the lengths of the secondary structures 10 results in an end of each primary structure 9 being arranged at a position which is lower than and displaced in a backwards direction as compared to the position shown in FIGS. 8-10. Accordingly, the centres of mass of the load carrying arrangements 4 have been moved in a corresponding manner.

As a consequence, the centres of mass of the load carrying arrangements 4 have been moved to positions where an imaginary line 16 interconnecting the centres of mass intersects the tower structure 2, as shown in FIG. 12. It is also clear from FIG. 12 that a corresponding line, in the situation illustrated in FIGS. 8-10, would pass in front of the tower structure 2.

The positions of the centres of mass of the load carrying arrangements 4 of FIGS. 11-14 is very suitable during erection of the wind turbine, in particular during hoisting of the load carrying structure 3 along the tower structure 2 to an operating level. Since the imaginary line 16 interconnecting the centres of mass of the load carrying arrangements 4 intersects the tower structure, the load carrying structure is balanced with respect to the tower structure, and thereby the hoisting process can be performed in a more stable manner.

The invention claimed is:

1. A load carrying structure for a multirotor wind turbine, the load carrying structure being arranged for carrying two or more energy generating units of the multirotor wind turbine, and for being connected to a tower structure of the multirotor wind turbine, the load carrying structure comprising:

a first load carrying arrangement and a second load carrying arrangement, each load carrying arrangement being arranged to carry at least one energy generating unit, each load carrying arrangement comprising a primary structure and at least two secondary structures, the secondary structures extending on opposing sides of the primary structure between an energy generating unit carried by the load carrying arrangement and an attachment point at the tower structure, wherein gravity acting on the energy generating units causes push in the primary structures and pull in the secondary structures, thereby causing preload of the secondary structures.

2. The load carrying structure according to claim 1, wherein each primary structure is in the form of one or more compression bars.

3. The load carrying structure according to claim 1, wherein each secondary structure is in the form of one or more tension members.

4. The load carrying structure according claim 1, wherein each primary structure extends between a first end and a second end, the first end being attached to a flexure member arranged at or near the tower structure, and at least one energy generating unit being arranged at or near the second end.

5. The load carrying structure according to claim 4, wherein the flexure member is joined to the primary structure at a joint that allows the primary structure to move relative to the flexure member in multiple directions.

6. The load carrying structure according to claim 1, wherein the tower structure defines a longitudinal axis, and wherein each of the primary structures extends away from the tower structure along a direction which is arranged at an acute angle with respect to the longitudinal axis defined by the tower structure.

7. The load carrying structure according to claim 6, wherein each of the secondary structures extends away from the tower structure along a direction which is arranged substantially perpendicularly to the longitudinal axis defined by the tower structure.

8. The load carrying structure according to claim 6, wherein for at least one of the load carrying arrangements, a direction defined by a first secondary structure and a direction defined by a second secondary structure span a plane, and wherein the direction defined by the first secondary structure defines a first angle with respect to the direction defined by the primary structure, projected onto the plane, and the direction defined by the second secondary structure defines a second angle with respect to the direction defined by the primary structure, projected onto the plane.

9. The load carrying structure according to claim 8, wherein the first angle is equal to the second angle.

10. The load carrying structure according to claim 1, wherein the secondary structures have an adjustable length.

11. The load carrying structure according to claim 1, wherein each load carrying arrangement is attached to the tower structure via a yaw arrangement.

12. The load carrying structure according to claim 1, wherein two of the load carrying arrangements are connected to each other at one side of the tower structure.

13. The load carrying structure according to claim 1, wherein at least one energy generating unit is mounted on a load carrying arrangement in such a manner that a centre of mass of the energy generating unit substantially coincides with an attachment point between the energy generating unit and the load carrying arrangement, the attachment point further being a point of transfer of thrust loads from the energy generating unit to the load carrying arrangement.

14. A multirotor wind turbine comprising a tower structure having at least one load carrying structure according to claim 1 connected thereto.

15. A method for erecting a multirotor wind turbine comprising a tower structure and at least one load carrying structure according to claim 1, the method comprising the steps of:
   erecting the tower structure,
   arranging a load carrying structure at a base of the tower structure with a first load carrying arrangement and a second load carrying arrangement extending away from the tower structure on opposing sides of the tower structure, the first load carrying arrangement and the second load carrying arrangement each having at least part of at least one energy generating unit mounted thereon,
   attaching each of the secondary structures of each of the load carrying arrangements to the tower structure,
   adjusting the lengths of at least some of the secondary structures until a centre of mass of the first load carrying arrangement and a centre of mass of the second load carrying arrangement are interconnected by a line which passes the tower structure at a distance from a centre line of the tower structure which is between 0% and 150% of a radius of the tower structure, and
   hoisting the load carrying structure along the tower structure to an operating level.

16. The method according to claim 15, further comprising the step of re-adjusting the lengths of at least some of the secondary structures when the load carrying structure has been hoisted to the operating level, until the line interconnecting the centre of mass of the first load carrying arrangement and the centre of mass of the second load carrying arrangement does not intersect the tower structure.

17. The method according to claim 15, wherein the step of adjusting the lengths of at least some of the secondary structures comprises increasing the length of a first secondary structure of each of the load carrying arrangements and/or decreasing the length of a second secondary structure of each of the load carrying arrangements.

18. The method according to claim 15, wherein the step of adjusting the lengths of at least some of the secondary structures results in the centre of mass of the first load carrying arrangement and the centre of mass of the second load carrying arrangement to move in parallel directions.

19. The method according to claim 15, wherein the step of adjusting the lengths of at least some of the secondary structures results in the centre of mass of the first load carrying arrangement and the centre of mass of the second load carrying arrangement to move in a direction having a horizontal component and a downwardly directed component.

20. The method according to claim 15, wherein the step of hoisting the load carrying structure is performed using a jacking mechanism.

21. A method for handling a load carrying structure according to claim 1, the method comprising the steps of:
   arranging the load carrying structure adjacent to a yaw arrangement with a first load carrying arrangement and a second load carrying arrangement extending away from the yaw arrangement on opposing sides of the yaw arrangement, the first load carrying arrangement and the second load carrying arrangement each having at least part of at least one energy generating unit mounted thereon,
   attaching each of the secondary structures of each of the load carrying arrangements to the yaw arrangement, and
   adjusting the lengths of at least some of the secondary structures until a centre of mass of the first load carrying arrangement and a centre of mass of the second load carrying arrangement are interconnected by a line which passes the yaw arrangement at a distance from a centre line of the yaw arrangement which is between 0% and 150% of a radius of the yaw arrangement.

22. The method according to claim 21, further comprising the step of hoisting the yaw arrangement and the load carrying structure along a tower structure to an operating level.

\* \* \* \* \*